Patented May 22, 1934

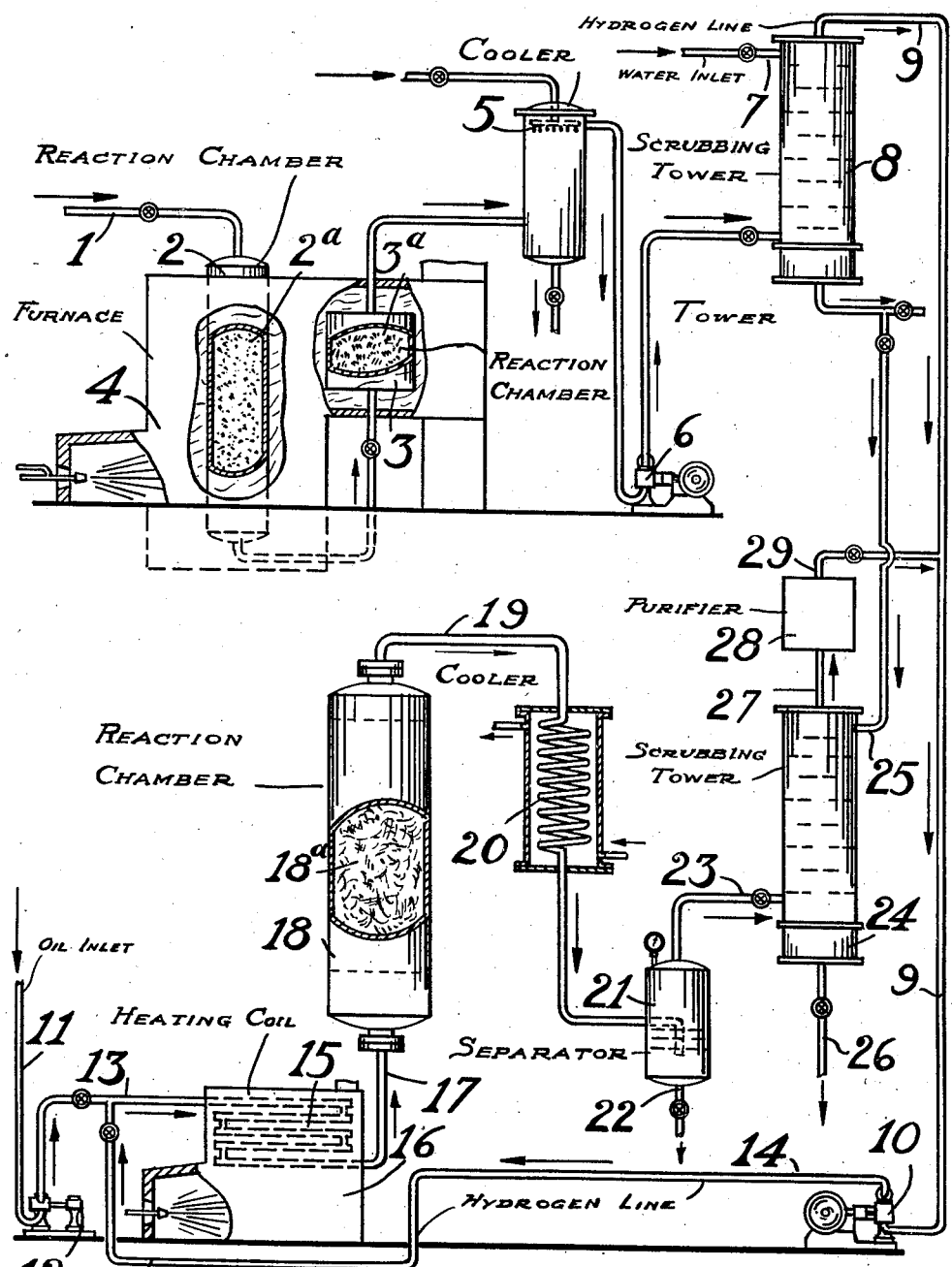

1,960,204

UNITED STATES PATENT OFFICE 1,960,204

PROCESS FOR THE HYDROGENATION OF CARBONACEOUS MATERIALS

Garland H. B. Davis, Baton Rouge, La., assignor to Standard-I. G. Company

Application January 8, 1931, Serial No. 507,527

3 Claims. (Cl. 196—53)

This invention relates to the hydrogenation of carbonaceous materials and more specifically comprises an improved method of scrubbing the gases evolved in the hydrogenation of such materials whereby ammonia contained in the gases is recovered in the form of pure ammonium carbonate. My improved process will be fully understood from the following description.

Carbonaceous materials such as coal, petroleum, petroleum distillates and residues, shale oil and analogous materials which normally contain small amounts of nitrogen, are heated to a temperature in excess of about 700° F. and are forced in fluent condition into a reaction chamber which is maintained under pressure in excess of 20 atmospheres, preferably 100 or 200 atmospheres or higher and at temperatures between about 700 and 1100° F.

Hydrogen or a gas rich in free hydrogen is also forced into the reaction chamber and is preferably introduced in admixture with the material to be treated. The hydrogen may be obtained from any suitable source. It may be conveniently prepared by passing hydrocarbon gases containing substantial quantities of methane, ethane and other lighter hydrocarbons with steam, with or without oxygen or air, over a catalytic material comprising the oxides of nickel and aluminum at temperatures between 800 and 1500° F. and for a further period at lower temperatures over a catalyst such as iron oxide. Carbon dioxide which is formed in the reaction is removed from the hydrogen by scrubbing with water preferably under pressure. The scrubbed gas will then contain from 80 to 95% hydrogen, the remainder consisting of nitrogen and small quantities of carbon dioxide, carbon monoxide, methane, and other gases.

Hydrogen may also be prepared by the water gas reaction. For my purposes the process may be operated with the steam and air passing through the coke simultaneously instead of intermittently as in the ordinary process, so that, if desirable, the nitrogen content of the resulting gases rich in hydrogen may be increased to well over the usual 3 to 5% normally present in water gas. The carbon dioxide formed may then be scrubbed out with water preferably under pressure, and the $CO_2$ water thus formed may be used in the subsequent scrubbing to remove ammonia.

In the reaction chamber the carbonaceous material undergoes hydrogenation, and non-hydrocarbon materials are largely converted to gaseous products, for example, sulfur is converted to hydrogen sulfide, and nitrogen to ammonia. The reaction chamber preferably contains a catalytic material which greatly increases the rate of hydrogenation. The oxides or sulfides of metals of the II, IV and VI groups of the periodic system, or mixtures of these, are suitable catalytic materials for this purpose and are characterized by immunity to sulfur poisoning. The oxides or sulfides of chromium, tungsten, and molybdenum are especially satisfactory and are preferably combined with the oxides of zinc or magnesium.

Vapors and liquid flowing out of the reaction chamber are cooled preferably by interchange of heat with cold feed material and the uncondensed gases and liquid are separated.

The uncondensed gases contain substantial quantities of hydrogen which may be advantageously recirculated to the high pressure reaction after the smaller amounts of lighter hydrocarbons, hydrogen sulfide and ammonia have been removed. These gases may be scrubbed first with water containing carbon dioxide which will remove practically nothing but the ammonia in the form of ammonium carbonate. For this purpose the carbon dioxide water already under pressure obtained from the scrubbing in the previously described manufacture of hydrogen may be conveniently used. The gases are under substantially the pressure maintained in the high pressure reactor and they are preferably scrubbed at this same pressure to avoid having to recompress the purified gas, although the scrubbing may be done at a lower pressure if desirable. The use of this acid scrubbing agent makes possible the recovery of ammonium carbonate free from sulfide and other impurities. The ammonium salt may be recovered from the wash liquor by any suitable means, such as by evaporation preferably under vacuum.

The gases which have now been freed from ammonia are then scrubbed with oil, preferably a light hydrocarbon oil, which removes most of the hydrogen sulfide and hydrocarbons. The absorbed hydrocarbons can be subsequently recovered by heating the oil.

The carbonaceous material to be treated will in general contain small quantities of nitrogen from which ammonia may be formed, but additional quantities of nitrogen may be introduced into the reaction chamber along with the carbonaceous material. The hydrogen when prepared by the methods described above will in general also contain a small quantity of nitrogen, but the nitrogen content may be still further increased in order to obtain higher yields of ammonia in the hydrogenation.

The drawing is a diagrammatic illustration partly in sectional elevation of one type of apparatus suitable for the present invention, and indicates the flow of materials therethrough. A suitable hydrocarbon, preferably of low molecular weight such as methane, is passed with steam and air by line 1 over a hydrocarbon conversion catalyst 2A such as promoted nickel in reaction chamber 2, and then over a suitable catalyst 3A for the conversion of carbon monoxide to carbon dioxide, such as iron oxide, in reaction chamber 3, maintained at a lower temperature. These chambers are heated by any suitable means, such as furnace 4. The gas leaving chamber 3 is then cooled by any suitable means such as by water spray 5, is raised to a suitable scrubbing pressure by compressor 6 and is scrubbed with water admitted by line 7 in tower 8 to remove the major part of the carbon dioxide content. The resulting hydrogen is then passed by line 9 to compressor 10, by which it is raised to a pressure suitable for destructive hydrogenation.

Oil supplied by line 11 is raised to a pressure suitable for destructive hydrogenation, such as 20 to 200 atmospheres or more, by pump 12 and is mixed in line 13 with hydrogen from line 14 and is then heated in coil 15 disposed in furnace 16 to a suitable reaction temperature. The heated mixture of oil and hydrogen then passes by line 17 to reaction chamber 18, which is suitably designed for the pressures and temperatures used. This reaction chamber contains a suitable hydrogenation catalyst 18A disposed therein. The hydrogenated products leave chamber 18 by line 19 and pass through cooler and condenser 20 into gas and liquid separator 21. Liquid products are withdrawn from the separator through line 22 to suitable storage or additional treatments (not shown). Uncondensed gases are withdrawn through line 23 and are passed through tower 24 countercurrent to an aqueous solution of carbon dioxide supplied by line 25 from tower 8. The resulting aqueous solution of ammonium carbonate is withdrawn through line 26 and is thereafter subjected to any suitable treatment for recovery of ammonium carbonate therefrom. The scrubbed gas is withdrawn from tower 24 through line 27 and may be purified of hydrogen sulphide, hydrocarbons and other impurities by any suitable means illustrated diagrammatically at 28. The purified gas may then be recycled to the hydrogenation unit by lines 29 and 9.

While my process for the recovery of substantially pure ammonium carbonate free from sulfide is applicable to the hydrogenation of any carbonaceous material containing nitrogen, it may be of particular utility in processes for hydrofining petroleum oils which have high sulfur content. When treating such oils the hydrogenation is carried out primarily for the purpose of removing the sulfur and in these cases especially, the introduction of additional nitrogen from an extraneous source may be employed to advantage, because the size of the reaction chamber and the quantity of hydrogen used are in general more than ample to remove the sulfur, and the combination of hydrogen with the added nitrogen to form ammonia will not materially interfere with the hydrofining of the oil.

In the operation of my process the scrubbing of the gases may be carried out in any suitable tower, such as one packed with inert material down through which the scrubbing liquor may trickle in countercurrent flow to the rising gases. The temperature of the gases entering the scrubbing tower is preferably maintained low enough to prevent heating up the water and driving off the carbon dioxide, and as will be understood can be varied considerably with satisfactory results. The concentration of the $CO_2$ in the water is preferably maintained as high as possible without causing excessive corrosion of the equipment because the greater the concentration the less the evaporation necessary and the smaller the amount of liquor that need be used. In other words, the concentration of the carbon dioxide is sufficient or more than sufficient to convert all the ammonia in the gas to ammonium carbonate.

If it is desirable the gas may be scrubbed with oil before the scrubbing with the $CO_2$ water. The oil will absorb substantial amounts of hydrogen sulfide, but will not dissolve appreciable quantities of ammonia. The volume of scrubbing oil may be adjusted to remove any desired portion of the hydrogen sulfide.

It has been found that a concentration of from 1 to 3% hydrogen sulfide is desirable in the circulating gas and this concentration may be maintained by returning hydrogen sulfide to the hydrogenation zone with the recirculated hydrogen.

This invention is not limited by any theory of the mechanism of the reactions nor by any details which have been given for purposes of illustration, but only by the following claims in which I wish to claim all novelty inherent in the invention.

I claim:

1. In a process of the type in which carbonaceous material is subjected to the action of a gas rich in free hydrogen under pressure in excess of 20 atmospheres and at temperatures in excess of 700° F. and in which the normally uncondensable gases formed comprise a large proportion of hydrogen and minor proportions of hydrogen sulfide and ammonia, the method of recovering the ammonia therefrom substantially free from other materials which comprises scrubbing the uncondensable gases with water containing a high concentration of carbon dioxide in an amount in substantial excess of that required to react with said ammonia, whereby substantially all the ammonia is converted to ammonium carbonate and recovering the ammonium carbonate so formed.

2. Process according to claim 1 in which the normally uncondensable gases are scrubbed with water containing carbon dioxide under substantially the same pressure as that under which the treatment with hydrogen is carried out.

3. Process according to claim 1 in which the uncondensable gases before being scrubbed with the water containing carbon dioxide are scrubbed with hydrocarbon oil whereby a substantial portion of the hydrogen sulfide is removed and the oil scrubbed gas contains 1 to 3% hydrogen sulphide.

GARLAND H. B. DAVIS.